(No Model.)
G. ANDERSON.
SCRUBBER FOR GAS.
No. 306,892. Patented Oct. 21, 1884.
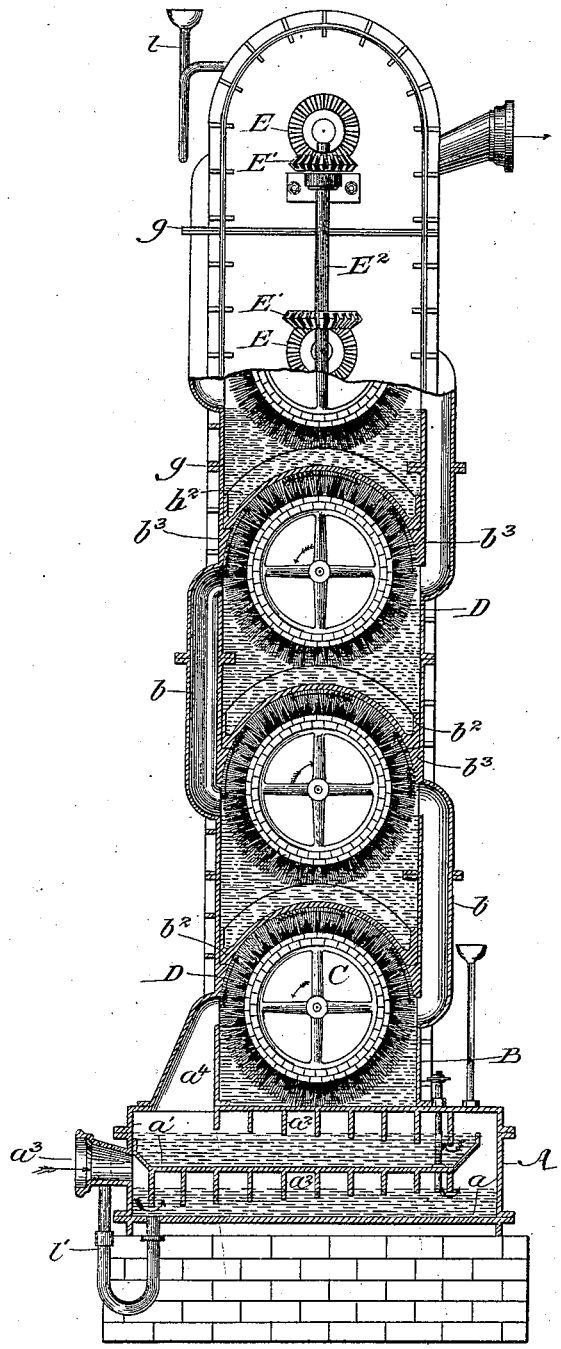
Witnesses:
Oscar L. Owen.
Frank S. Blanchard.
Inventor:
George Anderson
By Prince Fisher
Attorneys.

UNITED STATES PATENT OFFICE.

GEORGE ANDERSON, OF WESTMINSTER, ENGLAND, ASSIGNOR OF ONE-HALF TO WILLIAM H. CHAPPELL, OF CHICAGO, ILLINOIS.

SCRUBBER FOR GAS.

SPECIFICATION forming part of Letters Patent No. 306,892, dated October 21, 1884.

Application filed March 26, 1883. (No model.) Patented in England August 12, 1875, No. 2,843.

*To all whom it may concern:*

Be it known that I, GEORGE ANDERSON, a subject of the Queen of Great Britain, residing in the city of Westminster, England, have invented certain new and useful Improvements in Scrubbers for Gas; and I do hereby declare the following to be a full, clear, and exact description of the invention, sufficient to enable others skilled in the art to which it pertains to make and use the same, reference being had to the accompanying drawing, forming part of this specification.

The object of my improvement is to provide an apparatus which shall thoroughly free illuminating-gas from tarry vapors, ammonia-gas, and other like deleterious agents which impair its illuminating quality; and this object I have accomplished by the scrubber hereinafter described, illustrated in the accompanying drawing, and particularly defined in the claims at the end of the specification.

Upon a suitable base of masonry is placed what I designate the "preliminary washer" A. This washer consists of the water-pans $a$ and $a'$, which are provided with deflection-plates $a^2$, and sustain such relation to each other that when the gas enters through the delivery-pipe $a^3$ it will be forced by the plates to pass through the water of each pan until it escapes through the pipe $a^4$ into the first of the series of cleaning-chambers of the scrubber. Each of these cleaning-chambers consists of a liquid-reservoir, B, above which are journaled the cleaning-drums C in such position that when the reservoirs are filled with water or other purifying liquid the periphery of the drums will dip somewhat below the surface of the same. These drums may be formed of any suitable material, preferably wood, and their entire peripheries covered with the brush D of whalebone or other coarse fiber, securely held in place by a cement which will not be acted upon by the solvent properties of the gas. The bottom of each liquid-chamber, except the lowest, is curved, as shown, to conform to the brush, which fits closely beneath the same, so that the gas in its passage through each chamber must pass over each drum and through the fibers of each brush. Each cleaning-chamber is provided on one side with an induction-pipe and upon the opposite side with an eduction-pipe, the orifices of both these pipes $b$ being upon a level with the top of the liquid reservoir of the chamber. The eduction-pipe of one chamber extends to and constitutes the induction-pipe of the next chamber above, the top chamber being furnished with a suitable pipe for connecting to the main.

To one end of the axles of each of the brush-drums is attached a miter gear-wheel, $e$, which meshes in a companion wheel, $e'$, on the driving-shaft $e^2$, and by this means revolution is imparted to the several drums of the series. At the top of the scrubber is placed a delivery seal-pipe, $l$, of ordinary construction, by means of which liquid enters the uppermost reservoir of the series and passes in turn by overflow through connecting-pipes $b$ to each of the reservoirs B, thence to the pans $a'$ $a$, and so continuing until it discharges through siphon-pipe $l'$ at level of the pan $a$, showing thereby that the scrubber is filled and ready for use.

From the construction above set forth it will be seen that when the several reservoirs have been filled with purifying-liquid, and motion has been imparted to the driving-shaft, the fibers of the brush-drums will be kept constantly wet. As the gas to be purified is forced through the preliminary washer A, it is freed from its tarry impurities, and, passing through the pipe $a^3$ into the lowest cleansing-chamber, is caused to travel above the top of the drum and through the wet fibers of the brush until it escapes through the eduction-pipe of such chamber into the one above, and so on through the scrubber. As fresh liquid is constantly added to the top chamber, it overflows and passes out by the pipe $b$ into the chamber below, and thus from chamber to chamber until it is drawn from the preliminary washer. The motion given to the drums is in a direction contrary to that in which the gas is passing, thus causing it to be acted upon by a fresh surface of wet fibers, which take up its impurities and deposit them in the water as the drums revolve. When there is no mechanical power, the motion of the gas may be used to turn the drums; but in this case the brushes must revolve in the direction of the moving gas, and their action will not be as efficient.

The brush-drums of each cleaning-chamber should be so constructed that the gas cannot pass from the inlet-pipe on one side to the outlet-pipe on the opposite side without passing round the upper part of the brush. This is effected either by having the drum close at the circumference and lower edge, dipping into the water, as shown, or bars may be attached across the drum—say six in the circumference, so that before one leaves the water at least one other will have entered, and thus formed a partition across the vessel sealed in the liquid to prevent the gas passing under the drum.

In the drawing, five brushes are shown, placed vertically over each other; but they may be placed horizontally to each other, with only sufficient elevation, the one above the other, for the liquid to pass from the highest to the lowest brush, and the number of brushes may be increased or diminished and their dimensions altered according to the quantity of gas to be purified; but I prefer to have the brushes placed as shown in the drawing.

The fiber of which the brush is made should not be too fine, whalebone, such as is used in stable brushes, being found suitable for the purpose.

It is obvious that in many instances the brush portion of the scrubber may be advantageously employed without the preliminary washer; but in most cases, especially where the gases have been but imperfectly condensed, the use of the washer is preferable, as it serves to catch the tar in the bottom, and thus prevent a clogging of the brushes.

It will be noticed that the external casing of the scrubber is made up of separable sections, each containing one brush, and connected in any suitable manner at the points $g$, thus permitting the number of brushes of a machine to be varied as desired. It is preferable, also, that the plates on the ends of the casing should be so constructed as to be removable for the examination or replacement of the brushes as they wear out; but if the capacity of the scrubber be comparatively small—say not to exceed one hundred thousand cubic feet of gas per diem—the outer casing, instead of being formed of separate sections, may be cast in one piece, care being taken to provide openings in the casing sufficiently large to admit the brushes into the several compartments, which said openings may be closed by suitable doors tightly fitted to the casing. The curved partition-plates $b^2$, which separate the several chambers, rest on the ledges $b^3$ of the outer casing, and are carefully joined thereto to secure necessary tightness.

In usual practice the scrubber constructed as herein described is filled with water, and is arranged to receive the illuminating-gas immediately after the same leaves the condenser and just before its entry into the purifier. From eight to twelve gallons of fresh water should be supplied to the scrubber for each ton of coal that is coked, the brushes or drums being ordinarily maintained at a speed of from three to five revolutions per minute. Good results in freeing the gas from impurities are obtained as long as the water in the top chamber is not saturated to exceed one-half ounce sulphide of ammonium to the gallon, though it is manifest that as descent is made in the scrubber the percentage of impurities to the gallon increases materially, and this, too, without detrimental result, so that a solution is finally reached of strength sufficient to allow for its economic treatment, and for recovery of the salts in solution as lye products of the gas manufacture. Where several of the scrubbers are employed in series, the first may be set apart for removal of the carbon bisulphide and the others for removal of the sulphureted hydrogen; or, again, aqua-ammonia or the like may be used in lieu of water to take up such impurities, as the latter does not so readily absorb. It should be understood, moreover, that other than illuminating-gases may be successfully treated in a scrubber such as described. For example, free ammonia-gas may be discharged into and caused to circulate throughout the scrubber, in which event the water contained in the several chambers will dissolve more or less of said gas and produce the ordinary aqua-ammonia. The invention is not, therefore, confined to any particular use of the apparatus, but is intended to cover the construction of said scrubber, however the same may be employed.

Having thus described my invention, what I claim as new, and desire to secure by Letters Patent, is—

1. The combination, in a gas-scrubber, of a liquid-reservoir, a rotary brush in said reservoir, and induction and eduction pipes arranged upon opposite sides of the reservoir to cause the gas to pass through the brush, substantially as described.

2. The combination, in a gas-scrubber, of a liquid-reservoir, a rotary drum or brush in said reservoir, a curved plate above said drum or brush, and induction and eduction pipes for the gas, substantially as described.

3. The combination, in a gas-scrubber, of a series of liquid-reservoirs, rotary drums or brushes in said reservoirs, and induction and eduction pipes opening into the sides of the reservoirs at points about on a line with the axes of the drums and opposite each other, substantially as described.

4. The combination, in a gas-scrubber, of a series of cleaning-brushes, liquid-reservoirs, and a series of induction and eduction pipes connecting said reservoirs, substantially as described.

5. The combination of a series of cleaning-brushes and liquid-reservoirs located one above another, induction and eduction pipes located with respect to said drums, substantially as described, and mechanism for rotating said brushes, as set forth.

6. The combination, with the series of cleaning drums or brushes and the liquid-chambers, of preliminary washing-pans, substantially as described.

7. A gas-scrubber divided into superposed receptacles communicating through overflow-pipes constituting channels for the passage of both gas and liquid, in combination with the rotary cleaning-brushes and the geared shafts for operating the same, substantially as described.

8. An apparatus for scrubbing gas, consisting of a series of cases or chambers with upper and lower induction and eduction pipes, a suitable device within each of said chambers arranged to rotate while partially immersed in the liquid and in the path of the ascending gas, and a series of overflow-pipes arranged to open into each chamber opposite the rotating devices, substantially as shown, said overflow-pipes serving to conduct the gas in an upward and the liquid in a downward direction, substantially as described.

9. An apparatus for scrubbing gases, consisting of a series of cases or chambers connected by overflow-channels, arranged substantially as shown, whereby the same channels serve to conduct gas in an upward and liquid in a downward direction, and a series of rotating shafts arranged within said chambers, each shaft being furnished with suitable devices adapted to dip below the line of the overflow-channels and raise liquid into the path of the ascending gas, and suitable gearing for imparting rotation to said shafts, substantially as described.

In testimony whereof witness my hand this 27th day of the month of September, A. D. 1882.

GEORGE ANDERSON.

Witnesses:
  ROBERT H. J. COMERFORD,
  FREDERIC WILLOUGHBY,
*Clerks to Messrs. Comerford & Co., Public Notaries, London.*